(12) United States Patent
Merkel et al.

(10) Patent No.: US 8,254,628 B2
(45) Date of Patent: Aug. 28, 2012

(54) IMAGE PROCESSING DEVICE FOR DETECTING AND SUPPRESSING SHADOWS, METHOD, AND COMPUTER PROGRAM

(75) Inventors: Marcel Merkel, Hildesheim (DE); Jan Karl Warzelhan, Hildesheim (DE); Matthias Koenig, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1136 days.

(21) Appl. No.: 12/038,586

(22) Filed: Feb. 27, 2008

(65) Prior Publication Data

US 2009/0003725 A1    Jan. 1, 2009

(30) Foreign Application Priority Data

Jun. 26, 2007  (DE) .......................... 10 2007 029 476

(51) Int. Cl.
*G06K 9/00* (2006.01)
(52) U.S. Cl. ........................................................ 382/103
(58) Field of Classification Search .................. 382/103, 382/174; 348/169
See application file for complete search history.

(56) References Cited

U.S. PATENT DOCUMENTS

| | | | |
|---|---|---|---|
| 6,037,976 A | 3/2000 | Wixson | |
| 7,305,127 B2 * | 12/2007 | Wells | 382/168 |
| 7,639,878 B2 * | 12/2009 | Ibrahim et al. | 382/190 |
| 2001/0055414 A1 * | 12/2001 | Thieme | 382/135 |
| 2004/0228503 A1 * | 11/2004 | Cutler | 382/103 |
| 2007/0110309 A1 | 5/2007 | Ibrahim et al. | |
| 2007/0280504 A1 * | 12/2007 | Badawy et al. | 382/104 |

FOREIGN PATENT DOCUMENTS

JP        2005-251132     9/2005

OTHER PUBLICATIONS

Elgammal et al, "Non-parametric Model for Background Subtraction", Computer Vision, Lecture Notes in computer Science, 2000, vol. 1843/2000.*
"Supression of Cast Shadows for Improved Object Discrimination in Video Sequences" Al-Hamadi et al. Proc. 2005 Intern. Conference on Computational Intelligence for Modelling, Control and Automation, Vol. 2, 28-30111 2005, p. 518-523.
"Image-Based Traffic Monitoring With Shadow Suppression" Song et al. Proc of the IEEE, vol. 96, No. 2, Feb. 2007.
D. Greenhill et al: "Occlusion Analysis: Learning and . . . " in Object-Tracking, BMVC 2004, Kingston, Sep. 7-9, 2004 (in English).

* cited by examiner

*Primary Examiner* — Jason M Repko
*Assistant Examiner* — Shervin Nakhjavan
(74) *Attorney, Agent, or Firm* — Michael J. Striker

(57) ABSTRACT

An image processing device for the detection and suppression of shadows in a camera image of a surveilled scene, the camera image optionally showing static objects with static shadow regions and moving objects with dynamic shadow regions, includes a long-term module, which is designed to generate a long-term reference image of the surveilled scene by evaluating a long-term observation of a particular scene, a mid-term module, which is designed to generate a mid-term reference image of the surveilled scene by evaluating a mid-term observation of the particular scene, and a shadow detection module, which is designed to process camera image— using information technology—with long-term reference image and mid-term reference image, in order to detect and suppress shadows.

14 Claims, 2 Drawing Sheets ically detect the moving objects by determining the difference between a current camera image and a reference image of the scene that shows the background of the surveilled scene. A known problem associated with the use of image processing systems of this type is the fact that the illumination state of the surveilled scene changes, since, in the worst case, light sources or shadows that occur are detected as moving objects. To reduce the impact of this problem, the reference image of the scene is typically updated slowly but continually, to compensate for incremental changes in the illumination state. Even when a reference image of a scene is updated, a sudden change in the illumination state, for example, such as the sun disappearing behind a cloud and then reappearing, may result in problems in the evaluation.

IMAGE PROCESSING DEVICE FOR DETECTING AND SUPPRESSING SHADOWS, METHOD, AND COMPUTER PROGRAM

CROSS-REFERENCE TO A RELATED APPLICATION

The invention described and claimed hereinbelow is also described in German Patent Application DE 10 2007 029 476.1 filed on Jun. 26, 2007. This German Patent Application, whose subject matter is incorporated here by reference, provides the basis for a claim of priority of invention under 35 U.S.C. 119(a)-(d).

BACKGROUND OF THE INVENTION

The present invention relates to an image processing device for the detection and suppression of shadows in a camera image of a surveilled scene, the camera image optionally showing static objects with static shadow regions and moving objects with dynamic shadow regions. Image processing device includes a long-term module, which is designed to generate a long-term reference image of the surveilled scene by evaluating a long-term observation of a surveilled scene, and a mid-term module, which is designed to generate a mid-term reference image of the surveilled scene by evaluating a mid-term observation of the surveilled scene, and a related method and computer program.

Video surveillance systems are used to observe public spaces, buildings, streets, intersections, and the like with a plurality of surveillance cameras. The streams of image data recorded by the surveillance cameras are often combined in surveillance centers, where they are evaluated by surveillence personnel or in an automated manner. In the automated evaluation, it is common to use image processing algorithms that separate moving objects from a static scenery background, to track these moving objects over time, and to trigger an alarm when specified conditions are fulfilled.

Image processing algorithms of this type typically detect the moving objects by determining the difference between a current camera image and a reference image of the scene that shows the background of the surveilled scene. A known problem associated with the use of image processing systems of this type is the fact that the illumination state of the surveilled scene changes, since, in the worst case, light sources or shadows that occur are detected as moving objects. To reduce the impact of this problem, the reference image of the scene is typically updated slowly but continually, to compensate for incremental changes in the illumination state. Even when a reference image of a scene is updated, a sudden change in the illumination state, for example, such as the sun disappearing behind a cloud and then reappearing, may result in problems in the evaluation.

Publication JP 2005251132 describes a shadow detector and a method for detecting shadow regions in an image, with which, in a first step, a reference image of a scene is removed from a current camera image, so that only moving objects and shadows of these moving objects are depicted as object regions in the differential image. In a further step, the pixel intensities in the object regions are compared with the pixel intensities of the current camera image and, if certain limits are exceeded, they are classified as shadow regions or as moving objects.

SUMMARY OF THE INVENTION

The present invention provides an image processing system for detecting and suppressing shadows a method for detecting and suppressing shadow regions in a camera image, and a computer program which constitute further improvements of the known systems, methods and computer programs.

The inventive image processing device is preferably designed as part of a video surveillance system that includes several stationary surveillance cameras, which are directed at one or more scenes to be observed.

The image processing device is suitable and/or designed to detect and suppress shadows in a camera image. The camera image is preferably part of a video sequence that is or was recorded by a surveillance camera that is directed at the scene to be observed. The scene to be observed may be a street, an intersection, a room, a location, e.g., in a city, a public building, a school, a university, or the like. The term "surveilled scene" is preferably understood to mean the entire area recorded with the surveillance camera. As an alternative, the camera image or video sequence may be acquired from a recording device, e.g., a video recorder.

The camera image optionally shows static objects, which are also referred to as background objects, with static shadow regions and moving objects, which are referred to as foreground objects, with dynamic shadow regions. Static shadow regions and static objects are preferably understood to mean shadow regions and objects that are located in the surveilled scene for longer than a defined time period, the time period being longer than the typical or expected dwell time of the appearance of a moving object in the surveilled scene.

The image processing system includes a long-term module, which is designed to create a long-term reference image of the surveilled scene, the long-term reference image of the scene being generated based on a long-term observation of the surveilled scene. The image processing device also includes a mid-term module, which generates a mid-term reference image of the scene, which is created by evaluating a mid-term observation of the particular scene. The long-term observation takes place over a longer period of time and/or over more illumination states of the surveilled scene than exist in the mid-term observation. "Illumination states" are understood to mean, in particular, states of the surveilled scene in which the surveilled scene is exposed to changing states of illumination, e.g., due to the motion of the sun. It is possible to select the long-term observation and the mid-term observation to overlap or to not overlap in terms of time.

The present invention provides a shadow detection module, which is designed to function using a program and/or circuitry to process the camera image—using information technology—with the long-term reference image and the mid-term reference image, in order to detect and suppress shadows. "To process using information technology" is understood to mean linking the three images described by any manner and in any order.

The advantage of the present invention is that it is possible to detect and, optionally, suppress shadow regions and the position of the shadow regions, in particular static shadow regions, in the surveilled scene and in the camera image. The present invention is therefore capable of generating an image of the surveilled scene using suppressed, static shadow regions. The shadow regions are formed, e.g., using three-dimensional structures in the surveilled scene, e.g., buildings. Another possible advantage is that the present invention is designed such that a distinction may be made between dynamic shadow regions, which are generated by moving objects and foreground objects, and static shadow regions, which are generated by static objects. It is therefore possible to create images without static shadow regions, which still show all moving objects and foreground objects together with their dynamic shadow regions. It is also possible, in particular, to filter out slow-moving shadows, the motion of which is due, e.g., to the trajectory of the sun, or to handle a sudden disappearance of direct sunlight due to clouds with no errors or a minimum of errors.

By filtering out static shadow regions in the surveilled scene or in the camera image, it is possible to markedly reduce the rate of false alarms of the video surveillance system. Since the known image processing algorithms for segmentation and motion detection are not entirely illumination-independent, the image processing device for detecting and suppressing shadows is an ideal add-on module for video surveillance systems of this type. The main advantage of the present invention is improved robustness in object tracking, which is also due to the fact that a distinction may be made between static and dynamic or non-static shadow regions.

In a preferred embodiment of the present invention, the long-term observation takes place over a period of several days and/or several illumination states of the surveilled scene. The long-term module is preferably designed so that a set of camera images of the surveilled scene is collected over a period of several days and/or illumination states. The number of camera images in the set and/or the duration of the observation are/is selected such that the set of camera images is representative of the surveilled scene and the selected time period. To generate the long-term reference image of the scene, the set of camera images is analyzed over time, with one image processing operation being used for the entire set of camera images. The calculation of the long-term reference image of the scene is preferably repeated at regular intervals, since the illumination and the shadow region position may change due to regular effects, such as seasonal changes, or due to unexpected effects, such as a building being built. The long-term module is preferably designed such that a long-term reference image of the scene is generated that shows the surveilled scene, but with static shadow regions, moving objects, and dynamic shadow regions having been filtered out, so that the long-term reference image of the scene shows only static objects.

In a further preferred embodiment of the present invention, it is provided that the mid-term observation extends for a period of several minutes or hours, and/or over a time period that is longer than the typical dwell time of a moving object under observation in the particular scene, and/or over a single illumination state. It is particularly preferred when the mid-term reference image of the scene is updated continually, in order to reflect the quasi-static characteristics of the surveilled scene in a current manner. Due to the short observation period, the mid-term reference image of the scene also shows static shadow regions, since, e.g., the shadow of a tree moves only slightly within a one-hour observation period. It is therefore preferred, as an alternative or in addition, for the mid-term model to be created, and a mid-term reference image to be generated with moving objects and dynamic shadow regions having being filtered out, so that only static objects and static shadow regions are shown.

In a preferred refinement of the present invention, the shadow detection module is designed to link the long-term reference image of the scene and the camera image, or, as an alternative, the mid-term reference image of the scene and the camera image with each other using information technology in such a manner that an intermediate image is created, in which the static objects have been filtered out, but in which static shadow regions (relative to the long-term reference image of the scene) or static shadow region artifacts (relative to the mid-term reference image of the scene), dynamic shadow regions, and moving objects are shown.

In a refinement of the present invention, the shadow detection module is designed such that the long-term reference image of the scene and the mid-term reference image of the scene are processed with each other using information technology in order to create a shadow image that only contains static shadow regions. This shadow image is based on the consideration that the long-term reference image of the scene shows no static shadow regions, but the mid-term reference image of the scene does show static shadow regions, due to the relatively short observation period. When a differential image is created from the long-term reference image of the scene and the mid-term reference image of the scene, the difference is the depiction of the static shadow regions.

In an optional, next operation, which is implemented in the shadow detection module, the intermediate image and the shadow image are processed with each other using information technology in order to generate an object image that only shows moving objects and dynamic shadow regions. Finally, in this operation, the static shadow regions shown in the shadow image are removed from the intermediate image, in order to generate the object image. This final object image is very well suited for use to segment, detect, and/or track objects.

In a preferred embodiment of the present invention, the shadow detection module is designed to detect and/or verify and/or suppress the dynamic the shadow regions by evaluating the static shadow regions, in particular in the intermediate image. As an alternative or in addition thereto, the development of the static shadow region over time may also be evaluated. For example, the position and/or orientation of the static shadow regions indicate the position of light sources, in particular the position of the sun. The dynamic shadow regions of the moving objects may be deduced from this information, since they must have a similar orientation. In addition, the shadow detection module may be deactivated, e.g., temporarily, depending on the detection of shadow regions, in particular static shadow regions. This embodiment is based on the consideration that an evaluation of shadow regions makes sense only when the scene to be monitored contains shadow regions. If there are no shadow regions, better results may be attained when the shadow detection module is switched off.

In an advantageous refinement of the present invention, depth information about the surveilled scene is also taken into account in the evaluation of the static shadow regions. Depth information of this type may be read out of a model of the surveilled scene, and/or it may be learned automatically. Methods for automatically learning depth information in surveilled scenes are known to one skilled in the art, e.g., from the scientific article by D. Greenhill, J. Renno, J. Orwell, and G. A, Jones der Kingston University: Occlusion Analysis: Learning and Utilising Depth Maps in Object-Tracking, BMVC 2004, Kingston, 7-9 Sep. 2004, the entire contents of which is incorporated in the present disclosure via reference. The position of one or more light sources is preferably determined by linking the depth information—using information technology—with the information about the static shadow regions and/or with the intermediate image. Based on the light source that was determined, the position of the dynamic shadow regions may also be predicted for the moving objects (e.g., to the left of the object diagonally below . . . ) This helps to increase the precision of the process of removing the shadow, and to increase the robustness of the system.

The shadow detection module is optionally designed to verify the static and dynamic shadow regions that were detected, e.g., by inspecting the pixel color of the shadow regions. If, e.g., the pixel color in the shadow regions differs from the pixel color in the long-term reference image of the scene or the mid-term reference image of the scene only in terms of brightness, this provides a strong indication of a shadow region, thereby making it possible to verify or confirm this shadow region.

A further object of the present invention is a method for detecting shadow regions in a camera image of a surveilled scene, which is preferably carried out on the image processing device and/or a video surveillance system with the image processing device. In initial steps, a mid-term reference image of the scene and a long-term reference image of the scene are generated and, in a further step, shadow regions are detected by processing or linking—using information technology—the camera image with the mid-term reference image of the scene and the long-term reference image of the scene.

A further object of the present invention is a computer program with program code means having the features described in Claim 13, which is designed to carry out the inventive method on a computer, a data processing system, in particular a control device, DSP, FPGA or on the inventive image processing device.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
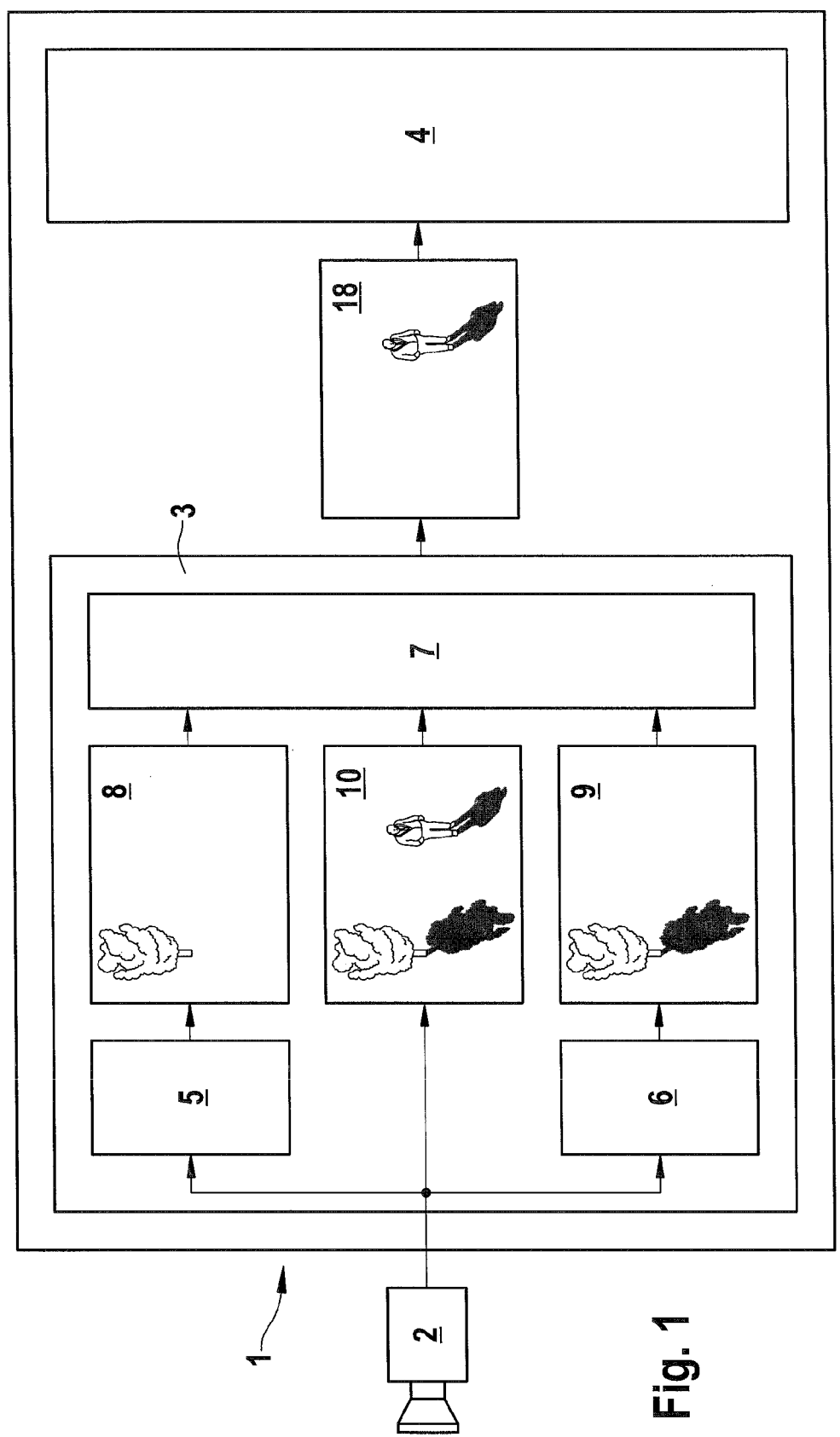
FIG. 1 shows a schematic depiction of a video surveillance system as an exemplary embodiment of the inventive device.

FIG. 1 shows a video surveillance system 1, which includes one or more surveillance cameras 2 that are directed at a surveilled scene (not shown). Starting at surveillance camera 2, the stream of image data is directed to an image processing device 2, in which the current camera images are processed for downstream object detection and/or tracking in a module 4.

Image processing device 3 includes a long-term module 5 and a mid-term module 6. Long-term module 5 is designed to create a long-term reference image 8 from a set of images of the surveilled scene that were recorded over several days. To this end, a series of images is recorded, starting at a start time $T_0$ until an end time $T_n$. The following set of images is therefore created:

$I(x,y,t) \in [t_0, \ldots t_n]$

One possibility for creating a long-term reference image 8 is to calculate the mean or the median of the color value or tonal value at very point in time for each pixel:

$B(x,y) = \text{mean}(I(x,y,t)) \forall t \in [t_0, \ldots t_n]$.

Once static shadow regions change during the recording period due to the motion of the sun, etc., the calculated mean or median of a pixel B (x, y) represents the value that the pixel takes on most of the time. By creating long-term reference image 8, it is therefore ensured that the static (but slow-moving) shadow regions are filtered out of the surveilled scene that is depicted.

A mid-term reference image 9 is created in mid-term module 6 in a similar manner, although the surveillance period is much shorter, and lasts, e.g., for one hour. The surveillance period is selected such that it is (much) longer, e.g., 3, 5 or 10-times longer than the expected dwell time of a moving object in the surveilled scene. Since the surveillance time is shorter, mid-term reference image 9 shows one or all static shadow regions. It is provided, in particular, that mid-term reference image 9 is updated continually, so that a current shadow status is depicted at all times.

Figure 2:
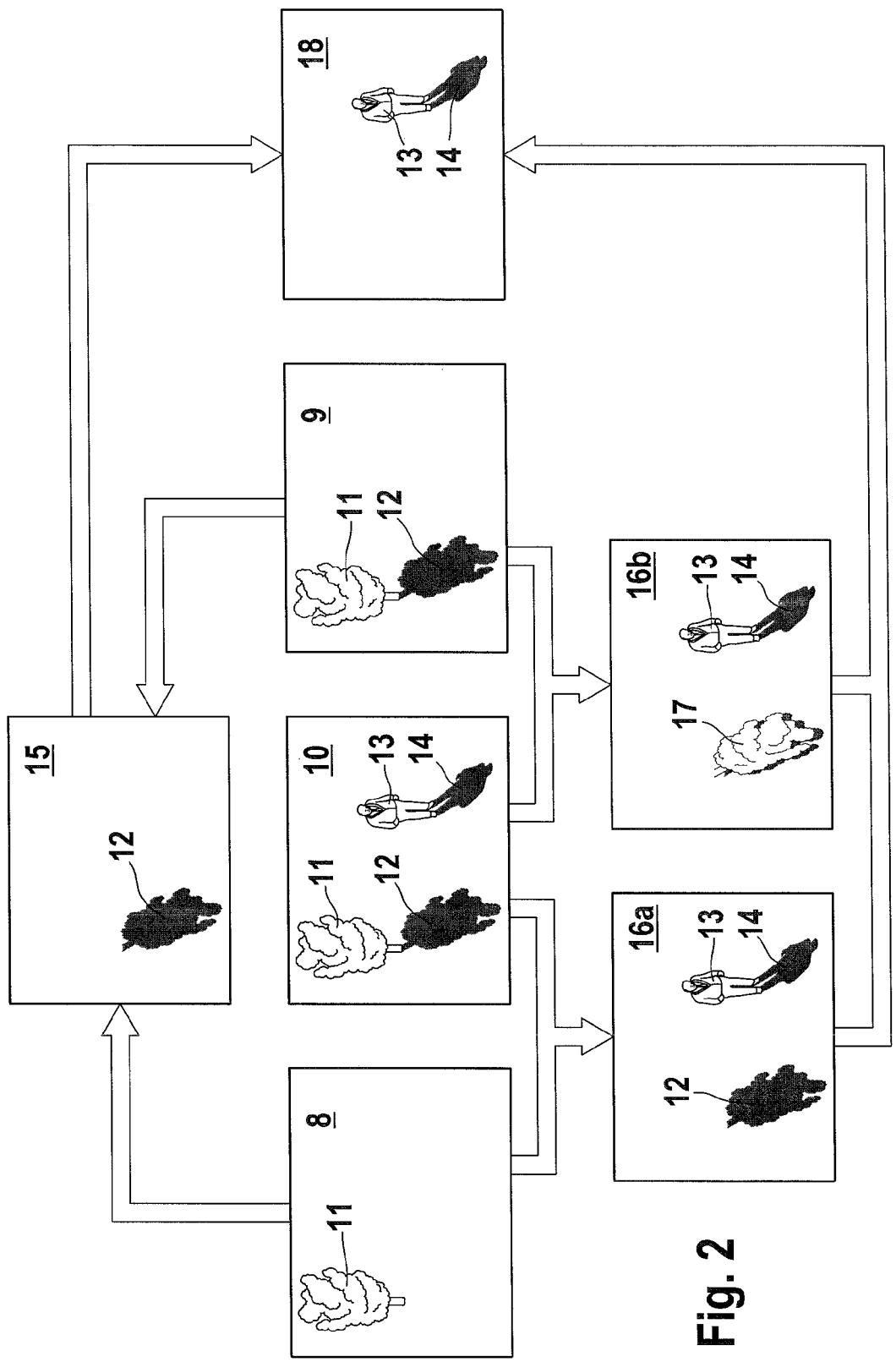
FIG. 2 shows a schematic depiction of the process of linking a long-term reference image of the scene, a mid-term reference image of the scene, and a current camera image, as an example of using the inventive method.

Image processing device 1 includes a shadow detection module 7, which is designed to process a current camera image 10, mid-term reference image 9, and long-term reference image 9 with each other using information technology. Reference is made to FIG. 2 to explain this type of linkage.

FIG. 2 shows, in a schematicized depiction, the process of linking long-term reference image 8, mid-term reference image 9, and current camera image 10, which represent the input data for the shadow detection module and which are shown in the middle row in FIG. 2. Long-term reference image 8 is the result of a long-term filtering of the surveilled scene and/or of camera images of the surveilled scene, and shows only static objects 11, e.g., a tree. Mid-term reference image 9, in contrast, is the result of a mid-term filtering of the surveilled scene and/or of camera images of the surveilled scene, and shows only static objects 11 (a tree), and static shadow regions 12 (shadows of the tree). Current camera image 10, in contrast, shows static objects 11 (a tree), static shadow regions 12 (shadows of the tree), a moving object 13 (a pedestrian), and its shadow region 14, which moves along with it.

In one processing step, long-term reference image 8 and mid-term reference image 9 are connected with each other using information technology, e.g., by calculating the difference:

$D_{Shadow\ image} = |B_{Long\text{-}term\ reference\ image} - B_{Mid\text{-}term\ reference\ image}|$ Once long-term reference image 8 shows no static shadow regions, shadow image 15 formed in this operation only shows differences that are based on static shadow regions 12 (tree shadows). Shadow image 15 may be interpreted, in particular, as a probability distribution for the position and presence of static shadow regions 12.

In a further processing step, either long-term reference image 8 and current camera image 10 are reconciled, or mid-term reference image 9 is reconciled with current camera image 10. Preferably, the difference is calculated once more. Depending on which scene reference image 8 or 9 is used, an intermediate image 16a or 16b is created. Intermediate image 16a only shows static shadow regions 12 (tree shadows), moving objects 13 (person), and dynamic shadow regions 14 (shadows moving with the moving objects). In contrast, intermediate image 16b also shows moving objects 13 and their accompanying shadow regions 14. Instead of a static shadow region 12, a shadow region artifact 17 is shown. Shadow region artifact 17 was created via the displacement of static shadow region 12 when the lighting changed, e.g., by the sun traveling across the sky. Intermediate images 16a, 16b therefore show the surveilled scene, with one or all static objects 11 (tree) having been filtered out.

In a further processing step, one of the intermediate images 16a, 16b and shadow image 15 are linked with each other using information technology, so that static shadow regions 11 (tree) and/or static shadow region artifacts 17 are filtered out. The result is an object image 18 that contains no static objects 11 or static shadow regions 12, but only moving objects 13 and their accompanying shadow regions 14.

With video surveillance system 1, object image 18 is forwarded to module 4 for object detection or tracking, which may now detect or track objects without error and without interference by static objects 11 and static shadow regions 12.

To verify detection of the shadow regions, it may be provided, as an option, to compare the pixel color and/or the intensity of pixels within dynamic or static shadow regions 14 or 12 with the corresponding values at the same image positions in the long-term reference image 8 or in the mid-term reference image 9. If the pixel values differ only in terms of their brightness, and not in terms of color—or if they do not differ greatly in terms of color—this is also a strong indication that this is a shadow region 14 or 12.

It will be understood that each of the elements described above, or two or more together, may also find a useful application in other types of methods and constructions differing from the type described above.

While the invention has been illustrated and described as embodied in an image processing device for detecting and suppressing shadows, method, and computer program, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. An image processing device for detecting and suppressing shadows in a camera image of a surveilled scene, which camera image optionally shows static objects with static shadow regions and moving objects with dynamic shadow regions, the image processing device comprising:
   a processor, said process including a long-term recording module configured to generate a long-term reference image of the surveilled scene by evaluating a long-term observation of the surveilled scene; a mid-term recording module configured to generate a mid-term reference image of the surveilled scene by evaluating a mid-term observation of the surveilled scene; and a shadow-detecting module configured to process the camera image, using information technology, with the long-term reference image and the mid-term reference image in order to detect and suppress shadows; and
   means for filtering out static shadow regions, moving objects, and dynamic shadow regions out of the long-term reference image, so that the long-term reference image shows static objects in the surveilled scene.

2. An image processing device as defined in claim 1, wherein said long-term module is configured so that the long-term observation takes place over a period selected from the group consisting of several days, several illumination states of the surveilled scene, or both.

3. An image processing device as defined in claim 1, wherein said mid-term module is configured so that the mid-term observation extends for a period selected from the group consisting of a time period of several minutes or hours, a time period that is longer than a typical dwell time of a moving object under observation in a particular scene, over a single illumination state, and combinations thereof.

4. An image processing device as defined in claim 1, wherein said shadow detection module is configured to verify shadow regions selected from the group consisting of static shadow regions, dynamic shadow regions, and both, by evaluating a pixel color.

5. An image processing device for detecting and suppressing shadows in a camera image of a surveilled scene, which camera image optionally shows static objects with static shadow regions and moving objects with dynamic shadow regions, the image processing device comprising:
   a processor, said process including a long-term recording module configured to generate a long-term reference image of the surveilled scene by evaluating a long-term observation of the surveilled scene; a mid-term recording module configured to generate a mid-term reference image of the surveilled scene by evaluating a mid-term observation of the surveilled scene; and a shadow-detecting module configured to process the camera image, using information technology, with the long-term reference image and the mid-term reference image in order to detect and suppress shadows; and
   means for filtering moving objects and dynamic shadow regions out of the mid-term reference image so that the mid-term reference image shows static objects and static shadow regions in the surveilled scene.

6. An image processing device for detecting and suppressing shadows in a camera image of a surveilled scene, which camera image optionally shows static objects with static shadow regions and moving objects with dynamic shadow regions, the image processing device comprising:
   a processor, said process including a long-term recording module configured to generate a long-term reference image of the surveilled scene by evaluating a long-term observation of the surveilled scene; a mid-term recording module configured to generate a mid-term reference image of the surveilled scene by evaluating a mid-term observation of the surveilled scene; and a shadow-detecting module configured to process the camera image, using information technology, with the long-term reference image and the mid-term reference image in order to detect and suppress shadows,
   wherein said shadow detection module is configured to generate an intermediate image based on a comparison selected from the group consisting of a comparison of the long-term reference image and the camera image, a comparison between the mid-term reference image and the camera image, and both, which intermediate image shows static shadow regions or static shadow region artifacts, dynamic shadow regions, and moving objects, but no static objects in the surveilled scene.

7. An image processing device as defined in claim 6; and further comprising means for creating an object image by comparing the intermediate image and the shadow image, which object image shows only moving objects and dynamic shadow regions.

8. An image processing device for detecting and suppressing shadows in a camera image of a surveilled scene, which camera image optionally shows static objects with static shadow regions and moving objects with dynamic shadow regions, the image processing device comprising:
   a processor, said process including a long-term recording module configured to generate a long-term reference image of the surveilled scene by evaluating a long-term observation of the surveilled scene; a mid-term recording module configured to generate a mid-term reference image of the surveilled scene by evaluating a mid-term observation of the surveilled scene; and a shadow-detecting module configured to process the camera image, using information technology, with the long-term reference image and the mid-term reference image in order to detect and suppress shadows, wherein said shadow detection module is configured to generate a shadow image based on a comparison of the long-term reference image and the mid-term reference image, which shadow image shows only static shadow regions in the surveilled scene.

9. An image processing device for detecting and suppressing shadows in a camera image of a surveilled scene, which camera image optionally shows static objects with static shadow regions and moving objects with dynamic shadow regions, the image processing device comprising:

a processor, said process including a long-term recording module configured to generate a long-term reference image of the surveilled scene by evaluating a long-term observation of the surveilled scene; a mid-term recording module configured to generate a mid-term reference image of the surveilled scene by evaluating a mid-term observation of the surveilled scene; and a shadow-detecting module configured to process the camera image, using information technology, with the long-term reference image and the mid-term reference image in order to detect and suppress shadows, wherein said shadow detection module is configured to deal with the dynamic shadow regions in a manner selected from the group consisting of detecting the dynamic shadow regions, verifying the dynamic shadow regions, suppressing the dynamic shadow regions, and combinations thereof, by evaluating the static shadow regions.

10. An image processing device as defined in claim 9, wherein said detection module is configured to deal with the dynamic shadow regions by evaluating the static shadow regions in an intermediate image.

11. An image processing device for detecting and suppressing shadows in a camera image of a surveilled scene, which camera image optionally shows static objects with static shadow regions and moving objects with dynamic shadow regions, the image processing device comprising:

a processor, said process including a long-term recording module configured to generate a long-term reference image of the surveilled scene by evaluating a long-term observation of the surveilled scene; a mid-term recording module configured to generate a mid-term reference image of the surveilled scene by evaluating a mid-term observation of the surveilled scene; and a shadow-detecting module configured to process the camera image, using information technology, with the long-term reference image and the mid-term reference image in order to detect and suppress shadows, wherein said shadow detection module is configured to take depth information about the surveilled scene into account in order to deal with the dynamic shadow regions in a manner selected from the group consisting of detecting the dynamic shadow regions, verifying the dynamic shadow regions, suppressing the dynamic shadow regions, and combinations thereof.

12. A method for detecting and/or suppressing shadow regions in a camera image of a surveilled scene, comprising the steps of;

generating a mid-term reference image by evaluating a mid-term observation in a particular scene;

generating a long-term reference image by evaluating a long-term observation of the particular scene;

detecting shadow regions by processing, using information technology, a camera image with the mid-term reference image and the long-term reference image; and filtering out static shadow regions, moving objects, and dynamic shadow regions out of the long-term reference image, so that the long-term reference image shows static objects in the surveilled scene.

13. A method as defined in claim 12; and further comprising using the image processing device for detecting and/or suppressing shadow regions in the camera image of the surveilled scene.

14. A non-transitory computer readable medium containing a computer program with program code means for carrying out the steps of the method as recited in claim 12 when the program is run on the computer, a data processing system, or the image processing device as recited in claim 1.

* * * * *